United States Patent
Wang

(10) Patent No.: US 7,020,280 B2
(45) Date of Patent: Mar. 28, 2006

(54) METHOD OF PROCESSING PHONE DIALING/REDIALING FUNCTION AND THE DEVICE THEREOF

(75) Inventor: Chien-Fa Wang, Taipei Hsien (TW)

(73) Assignee: Via Technologies, Inc., Taipei (TW)

( * ) Notice: Subject to any disclaimer, the term of this patent is extended or adjusted under 35 U.S.C. 154(b) by 402 days.

(21) Appl. No.: 09/854,203

(22) Filed: May 11, 2001

(65) Prior Publication Data

US 2001/0040961 A1    Nov. 15, 2001

(30) Foreign Application Priority Data

May 12, 2000    (TW) .............................. 89109123 A

(51) Int. Cl.
*H04M 3/00*    (2006.01)
(52) U.S. Cl. .................. 379/418; 379/357.04; 379/359
(58) Field of Classification Search ........... 379/216.01, 379/100.14, 280, 281, 355.02, 359, 418, 379/357.04
See application file for complete search history.

(56) References Cited

U.S. PATENT DOCUMENTS 5,966,436 A  *  10/1999  Kim ........................... 379/359

* cited by examiner

*Primary Examiner*—Jefferey F. Harold
(74) *Attorney, Agent, or Firm*—Rabin & Berdo, P.C.

(57) ABSTRACT

A method of processing a phone dialing process. At first, whether the dial key signal of the dial device is inputted is checked. When the dial key signals of the dial device are inputted and the dial device is not connected, that is, a user is pressing a phone number, the values corresponding to the inputted dial key signals are sequentially stored in a first memory. When the dial device is connected but the dial key signals of the dial device are still inputted, which means that the user is pressing an extension number or a key instruction, the values corresponding to the inputted dial key signal are also stored in the first memory. In addition, at least a time value is stored in a second memory. During the redial procedure, the time value can be used to properly process the time delay problem between the normal phone number and the extension number.

21 Claims, 4 Drawing Sheets

METHOD OF PROCESSING PHONE DIALING/REDIALING FUNCTION AND THE DEVICE THEREOF

BACKGROUND OF THE INVENTION

1. Field of the Invention

The present invention relates to a phone dialing technique, and more particularly, to the dial/redial functions of general phones so as to improve the dial/redial functions in practical applications.

2. Description of the Related Art

General phones provide a so-called redial function, in which, a user doesn't have to press number keys again and the phone number pressed previously can be recalled by pressing a specified key. In fact, the redial function is implemented by a previous process in a dialing action. Along with drawings, a procedure of processing a dialing action in the prior art is described below in detail.

FIG. 1 (PRIOR ART) shows a state transfer diagram of phone dialing actions in the prior art. In the following descriptions, oval boxes indicate states, rectangles boxes indicate state transfer conditions triggered by a phone or the processing actions of a phone, and trapezoid boxes indicate state transfer conditions triggered by a user or the actions of a user. As shown in FIG. 1, the dialing procedure includes the following states: an off state S1, an idle state S2, a key-pressing state S3, a dial state S4, and an off-line state S5.

Before the phone is powered on, the system is in the off state S1. After powered on, the system transfers to the idle state S2. During the transfer procedure, the phone first clears a parameter KEY_CNT as 0 (P1). The parameter KEY_CNT, for counting pressed keys, is set as 0 in the idle state S2 because the user has not pressed any key yet. Then, when the user picks up the handset (A2), the phone shows a dial tone, enters the key-pressing state S3, and waits for keys pressed. Meanwhile, if the user presses the redial key (A3), it proceeds to the redial procedure (P3), that is, the previously stored phone number is dialed. On the other hand, the user usually presses dial keys, such as the numeral keys of "0"~"9" (A4), and starts to dial; then the phone stores the values X corresponding to the pressed dial keys in a parameter REDIAL[1], increases the parameter KEY_CNT by 1 (P4), and transfers to the dial state S4. The parameter REDIAL indicates an array, storing the values that respectively correspond to the dial keys pressed by the user. Then, the user continues to press the other keys of a phone number (A5) while the system keeps in the dial state S4; each time a dial key is pressed, the parameter KEY_CNT is increased by 1 (P4) and the values X corresponding to the pressed dial keys are stored in a parameter REDIAL[KEY_CNT+1] (P5).

When the user finishes dialing, the system is transferred to a different state according to a different dialing state. For example, if the user tries to dial the phone number 2218-5452 and the line is through after the user finishes dialing the eight keys (P7), the system returns to the key-pressing state S3 and the user can start to communicate. On the other hand, if the user presses a wrong number or the line is busy (P8), the system is transferred to the off-line state S5 indicating that the line is not through, and the system returns to the idle state S2 after the user hangs up (A6). If the user inputs the correct number in the previous step, as long as the user picks up the handset (i.e. enters the key-pressing state S3) and presses the redial key, the phone number values previously stored in the array parameter REDIAL can be outputted sequentially via the redial procedure P3.

There are defects in the application during the dialing procedure shown in FIG. 1. That is, the dialing procedure is neither suitable for a number with an extension number nor suitable for a connected number followed by a specified key. Referring to FIG. 1, when the system is in the dial state S4, the system will return to the key-pressing state S3 as long as the user finishes pressing all the dial keys and gets through. Meanwhile, if the user follows the audio instruction from the other party and presses an extension number or other specified keys, the system will jump to the dial state S4 till the call is through. When the system jumps from the key-pressing state S3 to the dial state S4, the phone sets the parameter KEY_CNT as 1 and stores the values corresponding to the newly inputted keys in the parameter REDIAL[1], that is, the first set that is a phone number previously stored is cleared. If the user presses the redial key, the second set that is an extension number or a key instruction is actually redialed, and therefore the redial function required can't be achieved. On the other hand, when the phone number is pressed and through, generally the extension number or key instruction can not be pressed till the audio instruction is heard. Further, the redial actions of a phone number and an extension number can not be processed separately in a conventional technique.

SUMMARY OF THE INVENTION

Accordingly, the object of the invention provides a method of processing phone dialing and redialing functions and the dial device thereof, which can handle the situation that the other party is an automatically answering system, which requires an extension number or a key instruction after pressing the normal phone number.

According to the aforementioned object, the present invention provides a method of processing a phone dialing function. At first, it is checked whether a dial key of the dial device is pressed. When the dial key signals of the dial device are inputted and the line is not connected, which means that a user is pressing a phone number, the values corresponding to the inputted dial key signals are sequentially stored in a first memory. In addition, a plurality of label values, such as "0", are simultaneously stored in a second memory for identifying the values stored in the first memory as the phone number part. When the line is connected but the user still pressing the dial key of the dial device, which might be an extension number or key instruction, the values corresponding to the inputted dial key signals are also sequentially stored in the first memory. In addition, at least a time value that represents the time interval between the currently inputted dial key signal and a previously inputted dial key signal are simultaneously stored in the second memory. This time value can be used to represent the separation between the normal phone number and the following extension number or key instruction. It is noted that the time value can also be set as a default value, such as 3 or 5 seconds. When the dial key signals are continuously received, an index value can be increased and stored in a third memory as a reference value in the storing steps of the first and second memories. After the dial key signals of the dial device are completely inputted, the values corresponding to all the dial key signals are stored in the first memory and at least one time value is stored in the second memory. In other words, the dialing actions of the user are fully copied. The user can further store the data stored in the first, second and third memories to a specified location of a fourth memory corresponding to a dialing record. As the dialing record is selected, the data in the corresponding specified location of the fourth memory can be retrieved back to the first, second and third memories via a redial procedure.

On the other hand, the present invention also provides a method of processing the phone redial function. Suppose that the values corresponding to the dial key signals of the desired phone number including its extension number and the time value are stored in the first memory and second memories, respectively. It is checked whether the redial key signal of the dial device is inputted. When the redial key signal is inputted, the dial tones of the dial key signals corresponding to the values in the first memory are sequentially sent. If the value being processed has a corresponding nonzero time value in the second memory, the dial tone will be delayed until the line is through and a time period of the corresponding time value expires. When the value being processed is zero in the second memory, the dial tone will not be delayed in being sent. The redial action can be properly processed when the extension number or the key instruction is required.

The present invention also provides a dial device, which includes a dial interface for receiving dial key signals, a first memory, a second memory and a processing unit coupled to the dial interface, the first memory and the second memory. When the dial interface of the dial device receives dial key signals, the values corresponding to inputted dial key signals are sequentially stored in the first memory and at least a time value corresponding to inputted dial key signal is stored in the second memory. For example, after the dial device is connected, the time values corresponding to the inputted dial key signals are sequentially stored in the second memory. Further, the dial interface of the dial device also includes a redial key signal. When the redial key signal is received, the dial tones of the dial key signals corresponding to the values in the first memory are sequentially sent. When the value being processed by the processing unit has a corresponding nonzero time value in the second memory, the dial tone will be delayed in being sent for a time period of the corresponding time value. When the value being processed by the processing unit has a corresponding zero label value in the second memory, the dial tone will not delayed in being sent. The dial device can be a telephone set or a modem.

BRIEF DESCRIPTION OF THE DRAWINGS

The present invention can be more fully understood from the following detailed description and preferred embodiments with reference to the accompanying drawings in which.

DETAILED DESCRIPTION OF THE PREFERRED EMBODIMENT

Figure 1:
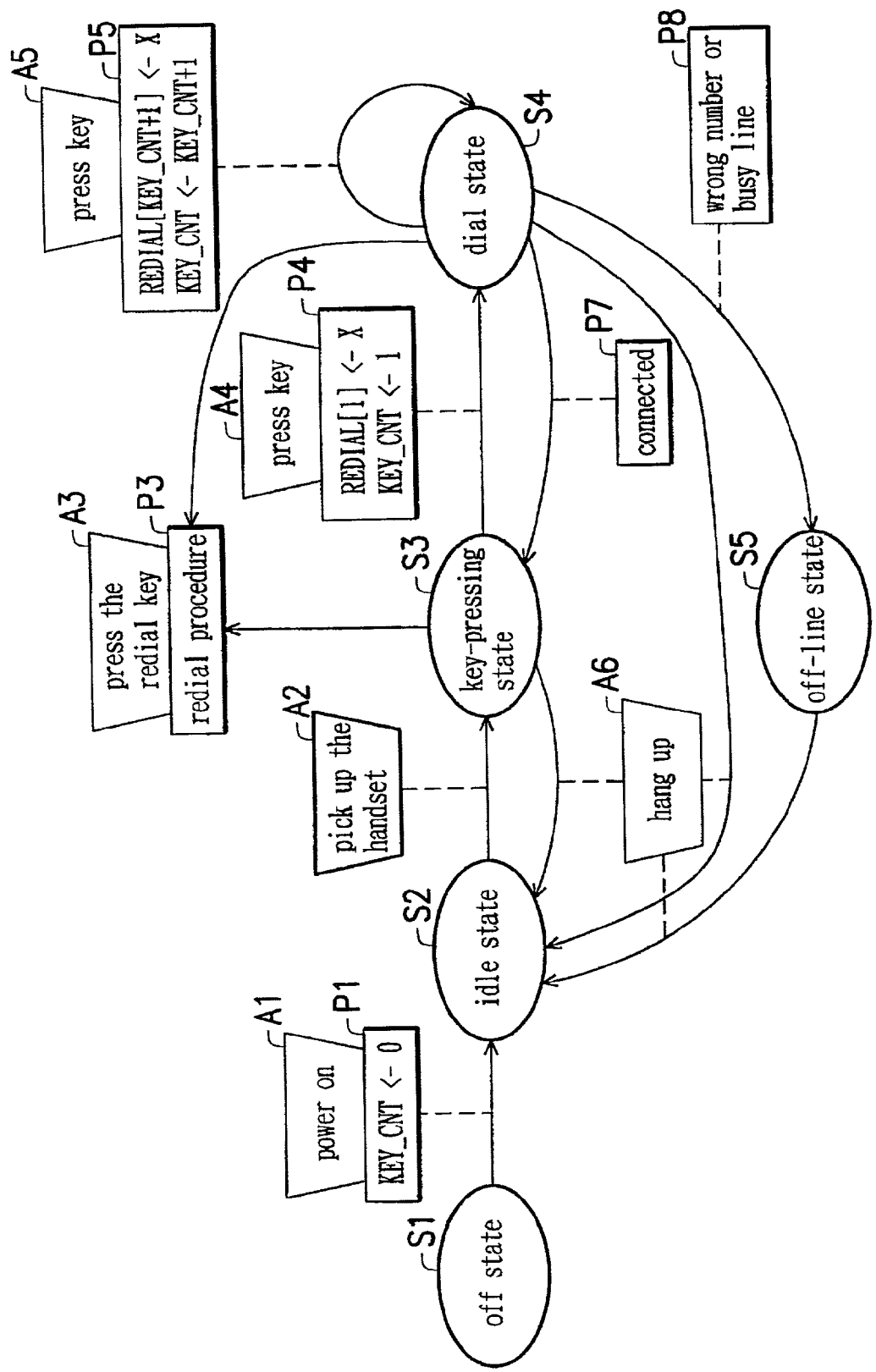
FIG. 1 (PRIOR ART) is a state-transferring diagram showing an action of conventional phone dialing.
Figure 2:
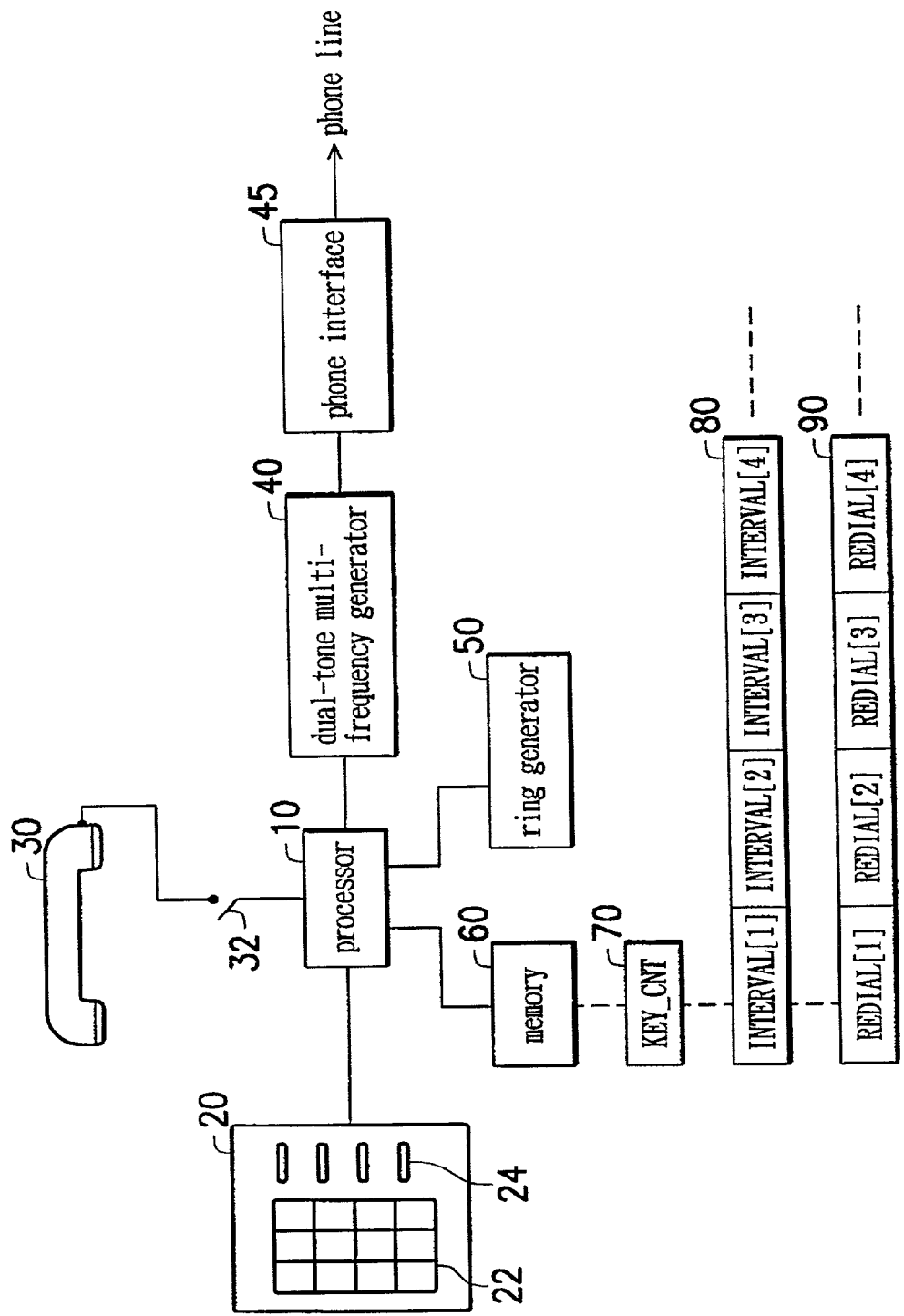
FIG. 2 is a schematic diagram showing a hardware structure of a phone according to an embodiment of the invention.

FIG. 2 is a schematic diagram showing a hardware structure of a phone according to an embodiment of the present invention. The phone shown in FIG. 2 includes a processor 10, a key panel 20, a handset 30, a dual-tone multi-frequency generator 40, a phone interface 45, a ring generator 50 and a memory 60. The processor 10 is responsible for detecting and controlling the other devices and sending data according to an execution program therein. The phone dialing/redialing procedure is exemplified as follows. The key panel 20, located on the phone externally, receives the inputted phone number or other instructions from the user. As shown in the figure, the key panel 20 includes the dial key 22 and the redial key 24. The user can press the dial key 22 to proceed to dial or press the redial key 24 to proceed to redial, and the processor 10 can indirectly detect the pressed action and the pressed key type. The handset 30 is the part for the user to receive and send voices, the handset 30 being arranged in the recess part with a handset switch 32 in the hardware structure. When the handset 30 is hung up, the handset switch 32 is in a first state, in which state the handset can receive incoming calls. When the handset 30 is picked up, the handset switch 32 is in a second state, in which state the handset can receive dial or redial numbers. Similarly, the processor 10 can indirectly detect that the handset 30 is hung up or picked up. The dual-tone multi-frequency generator 40 processes the number inputted by the user or the redial/memory number stored in the memory 60 and transforms the number into a corresponding DTMF (Dual-Tone Multi-Frequency) signal. The phone interface 45 is connected to the external line so as to send a DTMF signal or a voice-transformed signal to the phone line. The ring generator 50 generates the ring of an incoming call. The memory 60 includes memories of various types, such as read only memory (ROM), random access memory (RAM), or other non-volatile memories, such as Flash Memory. Generally, a ROM processes fixed program code and data, such as the below-described dial/redial program code that is loaded into the processor 10 to execute. A RAM or a flash memory, storing erasable or temporary programs code or data, can be the storage media for the parameter values described below.

As shown in FIG. 2, the memory 70 stores a parameter KEY_CNT, the memory 80 stores an array parameter INTERVAL[ ], and the memory 90 stores the array REDIAL[ ]. In the embodiment, the parameter KEY_CNT is an index value, which is used as a reference value when INTERVAL[ ] and REDIAL[ ] are set so as to sequentially process the elements in each array. The parameter KEY_CNT is increased each time the user presses a dial key. The array REDIAL[ ] sequentially stores all the values corresponding to the dial keys pressed by the user during the dial procedure. A new array parameter INTERVAL[ ] stores the time values correlated to the dial keys pressed by the user. For example, INTERVAL[7] stores an interval, which can be the time interval between the dial key corresponding to REDIAL[6] and the dial key corresponding to REDIAL[7], or a predetermined time value, such as 3 or 5 seconds. It is noted that the invention is not limited to the embodiment in which only the time value, corresponding to a dial key when the user keys in a general phone number and gets through, is stored. Actually, the time values corresponding to all keys can also be stored, or only the time interval between the pressed phone number and the pressed extension number is recorded.

Figure 3:
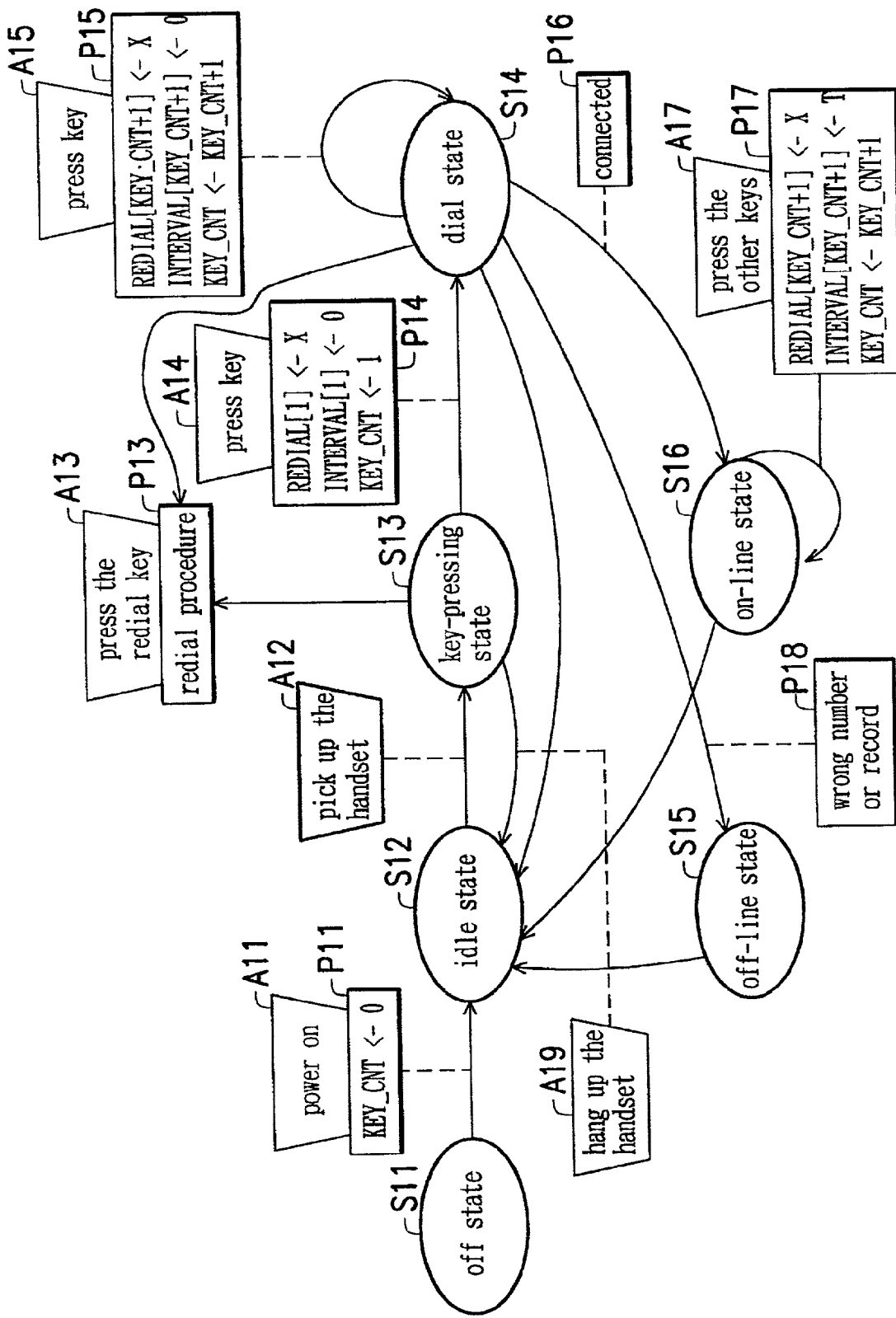
FIG. 3 is a state-transferring diagram showing an action of phone dialing according to an embodiment of the invention.

FIG. 3 is a state-transferring diagram showing an action of phone dialing according to the embodiment of the present invention. As shown in the figure, the dial procedure includes the states as follows: an off state S11, an idle state S12, a key-pressing state S13, a dial state S14, an off-line state S15, and a newly added on-line state S16. The operation is described below in detail.

Before the phone is powered on, the system is in the off state S1. After powered on (A11), the phone clears the parameter KEY_CNT as 0 (P11) and the system transfers to the idle state S12. Then, after the user picks up the handset (A12), the system enters the key-pressing state S13 and waits for the user to press a dial key or a redial key. If the user presses the redial key (A13), it proceeds to the redial procedure (P13), which will be described later. So far, it is basically the same as the prior art.

When the user presses the dial key (A14) to start pressing the first dial key in the key-pressing state S13, the phone first stores the value X corresponding to the pressed dial key in the parameter REDIAL [1], writes the data "0" in the parameter INTERVAL[1], increases the parameter KEY_CNT by 1 (P14) and transfers to the dial state S14. Meanwhile, the data "0" written in the parameter INTERVAL[1] denotes a label value, which indicates that the currently inputted key belongs to the phone number part. Then, the user can go on pressing the other keys of the phone number (A15). The system generally keeps in the dial state S14, and the parameter KEY_CNT is increased by 1 each time the dial key is pressed. The corresponding parameter INTERVAL[KEY_CNT+1] stores 0 (label value), and the value X corresponding to the pressed dial key is stored in the parameter REDIAL[KEY_CNT+1] (P15).

When the user finishes pressing a phone number, the system is transferred to a different state according to a different dialing state and operation method. After the user finishes dialing all the dial keys, if it succeeds in connection (P16), the system transfers to the on-line state S16 and the user can proceed to communicate. If the user presses a wrong number or the line is busy, the system transfers to the off-line state S15, indicating that the line is not through. Meanwhile, if the user hangs up the handset (A19), the system returns to the idle state S12. Provided that the system enters the on-line state S16 and proceeds to communicate and the extension number or the key instruction is required by the voice instruction of the other party, the user presses a dial key (A17) and the system still maintains the on-line state S16. At the same time, the phone increases the parameter KEY_CNT by 1, the corresponding parameter INTERVAL[KEY_CNT+1] stores the corresponding time value T (such as the interval between the current key and the previous key or fixed time value), and the value X corresponding to the pressed dial key is stored in the parameter REDIAL[KEY_CNT+1] (P17). When the user finishes inputting the extension number and succeeds in connecting, the system is still in the on-line state S16 and able to proceed to communicate. However, if it is not connected or the communication is finished, the user hangs up the handset (A19), the system returns to the idle state S12. After the aforementioned dial procedure is finished, the parameter REDIAL[ ] stores the phone number and the subsequently keyed-in extension number, and the parameter INTERVAL[ ] stores the label value (data 0) corresponding to the phone number part and stores the time value corresponding to the extension number.

If the setting of the aforementioned time value uses the interval between two adjacent keys, the timing function is necessary for the phone. For example, the processor 10 can be used to achieve the function, that is, the interval can be counted according to the clock. However, the implementation is not limited. Further, the parameters REDIAL[ ] and INTERVAL[ ] obtained in the aforementioned procedure can also be stored in the memory of the phone, for memorizing phone numbers.

Figure 4:
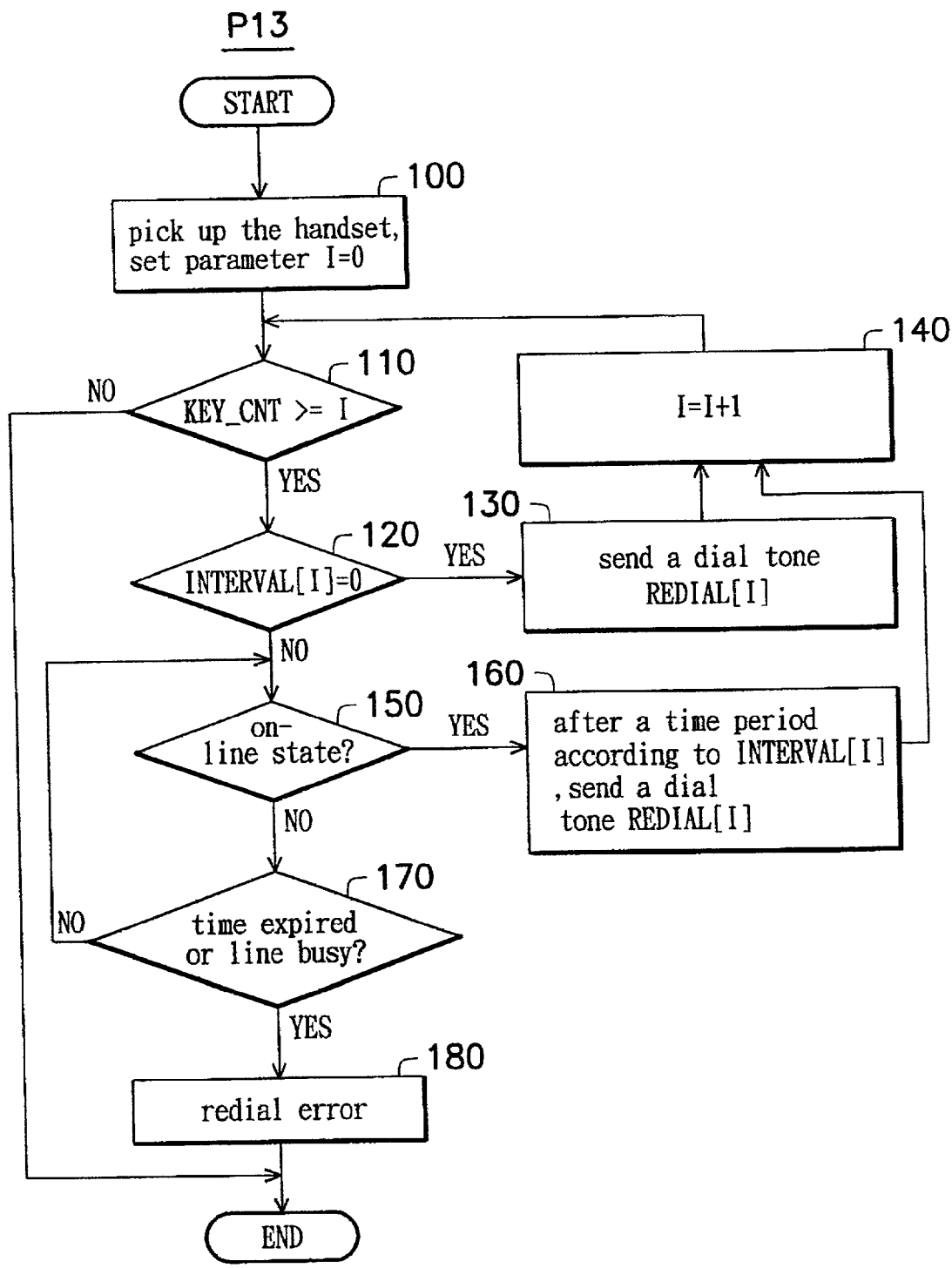
FIG. 4 shows a flow chart of the phone redial procedure according to the embodiment of the invention.

In the aforementioned dial procedure, no matter succeeding or failing in connecting, the user can pick up the handset in the idle state S12, enter the key-pressing state S13, and then press the redial key to enter the redial procedure P13. FIG. 4 shows a flow chart of the phone redial procedure P13 according to the embodiment of the present invention. At first, the user is currently in the state of picking up the handset, and the system sets a parameter I as 0 (step 100). The parameter I processes all the dial key values in the parameter REDIAL[ ]. Then, it is judged whether the parameter KEY_CNT set in the dial procedure is larger than the parameter I (step 110). If the parameter I has not increased to the parameter KEY_CNT, it is further judged that currently a phone number or an extension number needs to be processed (step 120) depending on if the parameter INTERVAL[I] is 0 (i.e. label value).

If a general phone number is currently to be processed (i.e. INTERVAL[I]=0), a dial tone is sent directly according to the parameter REDIAL[I] (step 130), and after the parameter I is increased by 1 (step 140) it proceeds to step 110. On the other hand, if it is not a general phone number that is to be processed (i.e. INTERVAL[I ]≠0), it is judged whether it is in the on-line state (step 150). If so, after a time period according to the parameter INTERVAL[I], a dial tone is sent according to the parameter REDIAL [I] (step 160). Then after the parameter I is increased by 1 (step 140), it proceeds to step 110. If the predetermined time is not exceeded yet and the line is not busy either (step 170), it returns to step 150 continuing to wait to be connected. If the predetermined time is exceeded or the line is busy, the redial error is shown (step 180) and a redial procedure is ended. On the other hand, if all the dial key values of the parameter REDIAL[I] are processed, the redial procedure can also be ended and the user proceeds to communicate.

Accordingly, via the dial and redial procedure of the embodiment, various redial states can be properly processed. Even if the extension number or key instruction is necessary for the audio automatically answering system, the redial action can also be properly executed. Further, the aforementioned skill of storing dial data can also be applied to phone book storage. That is, when the user dials a whole phone number and the subsequent extension number or the key instruction, the content of the current memory (including REDIAL[ ], INTERVAL[ ], KEY_CNT) can be stored in a specified phone record of the phone book (dial record). When the user needs to redial, an proper item from the phone record can first be selected, then the content of the corresponding memory is restored, and the redial key is pressed to proceed the redial action described above.

While the invention has been described with reference to various illustrative embodiments, the description is not intended to be construed in a limiting sense. Various modifications of the illustrative embodiments, as well as other embodiments of the invention, will be apparent to those persons skilled in the art upon reference to this description. It is therefor contemplated that the appended claims will cover any such modifications or embodiments that may fall within the scope of the invention defined by the following claims and their equivalents.

What is claimed is:

1. A method of processing phone dialing for a dial device, comprising the steps of:

checking whether any dial key signal of the dial device is inputted;

sequentially storing a plurality of first values corresponding to a plurality of first dial key signals in a first memory and sequentially storing a label value in a second memory when any dial key signal of the dial device is inputted and the dial device is not connected, wherein the label value indicates connection status of the dial device;

sequentially storing a plurality of second values corresponding to a plurality of second dial key signals in the first memory and sequentially storing a time value in the second memory when any dial key signal of the dial device is inputted and the dial device is connected; and increasing an index value and storing the index value in a third memory when the dial key signal of the dial device is inputted.

2. The method as claimed in claim 1, wherein the label value is "0".

3. The method as claimed in claim 1, wherein the time value denotes a time interval between the first dial key signals and the second dial key signals.

4. The method as claimed in claim 1, further comprising the steps of:

storing data stored in the first memory and said second memory to a specified location of a fourth memory corresponding to a dial record; and retrieving the data stored in the specified location of the fourth memory back to the first memory and the second memory when the dial record is selected.

5. The method as claimed in claim 1, wherein the dial device is a phone and the dial key signal is inputted by pressing a corresponding dial key of the phone.

6. The method as claimed in claim 1, wherein the dial device is a modem.

7. The method as recited in claim 1, further comprising the steps of:

checking whether a redial key signal of the dial device is inputted; and sequentially sending the first dial key signals corresponding to the first values and the second dial key signals corresponding to the second values for dialing when the redial key signal is inputted;

wherein the first dial key signals are not delayed in being sent and the second dial key signals are delayed to be sent for a time interval defined by the time value stored in the second memory.

8. A method of processing phone dialing for a dial device, comprising the steps of:

checking whether any dial key signal of the dial device is inputted;

sequentially storing a plurality of values corresponding to a plurality of dial key signals in a first memory and storing a plurality of time values in a second memory when any dial key signal of the dial device is inputted; and increasing an index value and storing the index value in a third memory when the dial key signal of the dial device is inputted.

9. The method as claimed in claim 8, wherein each time value denotes a time interval between the corresponding dial key signal and a previously inputted dial key signal.

10. The method as claimed in claim 8, further comprising the steps of:

storing data stored in the first memory and the second memory to a specified location of a fourth memory corresponding to a dial record; and retrieving the data from the specified location of the fourth memory back to the first memory and the second memory when the dial record is selected.

11. The method as claimed in claim 8, wherein the dial device is a phone and the dial key signal is inputted by pressing a corresponding dial key of the phone.

12. The method as claimed in claim 8, wherein the dial device is a modem.

13. The method as claim in claim 8, further comprising the steps of:

checking whether a redial key signal of the dial device is inputted; and sequentially sending the dial key signals corresponding to the values in the first memory for dialing when the redial key signal of the dial device is inputted;

wherein the dial key signals are respectively delayed to be sent in response to the time values stored in the second memory.

14. A method of processing phone redialing for a dial device, comprising the steps of:

providing a first memory that stores a plurality of values corresponding to a plurality of dial key signals of the dial device;

providing a second memory that stores a plurality of time values corresponding to a first part of the values in the first memory, and a plurality of label values corresponding to a second part of the values stored in the first memory, wherein the label values indicate connection status of the dial device;

checking whether a redial key signal of the dial device is inputted; and sequentially sending the dial key signals corresponding to the values stored in the first memory for dialing when the redial key signal is inputted;

wherein the dial key signals corresponding to the first part of the values stored in the first memory are delayed to be sent in response to the time values stored in the second memory, and the dial key signals corresponding to the second part of the values stored in the first memory are not delayed in being sent when the label values corresponding to the second part of the values are in the second memory; and increasing an index value and storing the index value in a third memory when the dial key signal of the dial device is inputted.

15. The method as claimed in claim 14, wherein said label values are zero.

16. The method as claimed in claim 14, wherein the dial device is a phone and the redial key signal is inputted by pressing a corresponding redial key of the phone.

17. The method as claimed in claim 14, wherein the dial device is a modem.

18. A dial device comprising:

a dial interface for receiving dial key signals;

a first memory;

a second memory;

a fourth memory having at least a specified location corresponding to a dial record, wherein the data of the first memory and the second memory are stored in the specified location of the fourth memory, and wherein the data stored in the specified location of the fourth memory are retrieved and stored back to the first memory and the second memory when the corresponding dial record is selected; and a processing unit, coupled to the dial interface, the first memory and the second memory, for sequentially storing values corresponding to the received dial key signals in the first memory, storing at least one time value corresponding to the received dial key signals in the second memory, and sequentially storing label values corresponding to the dial key signals inputted before the connection of the dial device to the second memory, wherein the label values indicate connection status of the dial device.

19. The dial device as claimed in claim 18, wherein each time value denotes a time interval between the corresponding dial key signal and a previously received dial key signal.

20. The dial device as claimed in claim 18, wherein the processing unit stores said at least one time value corresponding to the dial key signals inputted after the connection of the dial device to the second memory.

21. The dial device as claimed in claim 18, wherein the dial interface further receives a redial key signal;

wherein the dial key signals corresponding to the values in the first memory are sequentially sent for dialing when the redial key signal is received; and wherein the dial key signals are respectively delayed to be sent for a plurality of time intervals in response to the time values in the second memory.

* * * * *